United States Patent [19]

Nicolas

[11] 4,006,530
[45] Feb. 8, 1977

[54] APPARATUS FOR MEASURING THE DIAMETER OF A WELL BORE

[75] Inventor: Yves Nicolas, Versailles, France

[73] Assignee: Schlumberger Technology Corporation, New York, N.Y.

[22] Filed: July 16, 1975

[21] Appl. No.: 596,492

Related U.S. Application Data

[63] Continuation of Ser. No. 485,059, July 1, 1974, abandoned.

[30] Foreign Application Priority Data

Apr. 9, 1974  France .............................. 74.12370

[52] U.S. Cl. .............................................. 33/178 F
[51] Int. Cl.² ........................................ E21B 47/08
[58] Field of Search ...... 166/241; 33/178 F, 178 R, 33/178 E, 302, 314; 324/10

[56] References Cited

UNITED STATES PATENTS

| | | | |
|---|---|---|---|
| 1,708,354 | 4/1929 | Cabot ................... | 33/178 F |
| 2,787,839 | 4/1957 | Taylor ................... | 33/178 F |
| 2,892,258 | 6/1959 | Adamson ................. | 33/178 F |
| 3,044,175 | 7/1962 | Broome et al. ........... | 33/178 F |
| 3,323,612 | 6/1967 | Patterson et al. ........ | 33/302 |
| 3,555,689 | 1/1971 | Cubberly ................. | 33/178 F |

*Primary Examiner*—Richard E. Aegerter
*Assistant Examiner*—John W. Shepperd
*Attorney, Agent, or Firm*—Ernest R. Archambeau, Jr.; William R. Sherman; Stewart F. Moore

[57] ABSTRACT

In the representative embodiments of the apparatus of the present invention disclosed herein, a plurality of outwardly biased bow springs are disposed around a tool body and cooperatively arranged for centering the tool body in a well bore. The upper ends of the bow springs are pivotally secured to an intermediate portion thereof and their lower ends coupled together for longitudinal movement in relation to the lower portion of the body. To maintain the bow springs at a uniform spacing from the tool body when the tool is in a deviated well bore, a corresponding number of rigid arms are pivotally coupled to the mid-portion of each spring and extended upwardly to a pivotal connection on a collar which is slidably mounted on the tool body and biased downwardly. Diameter-measuring devices are cooperatively arranged on the tool body for operation in response to the expansion and retraction of the bow springs.

2 Claims, 6 Drawing Figures

FIG. 3
FIG. 4
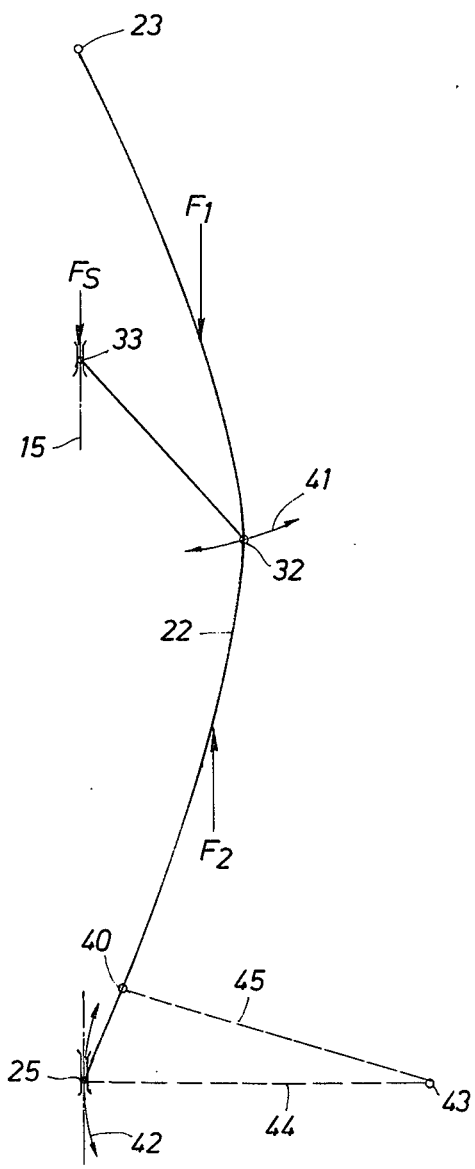
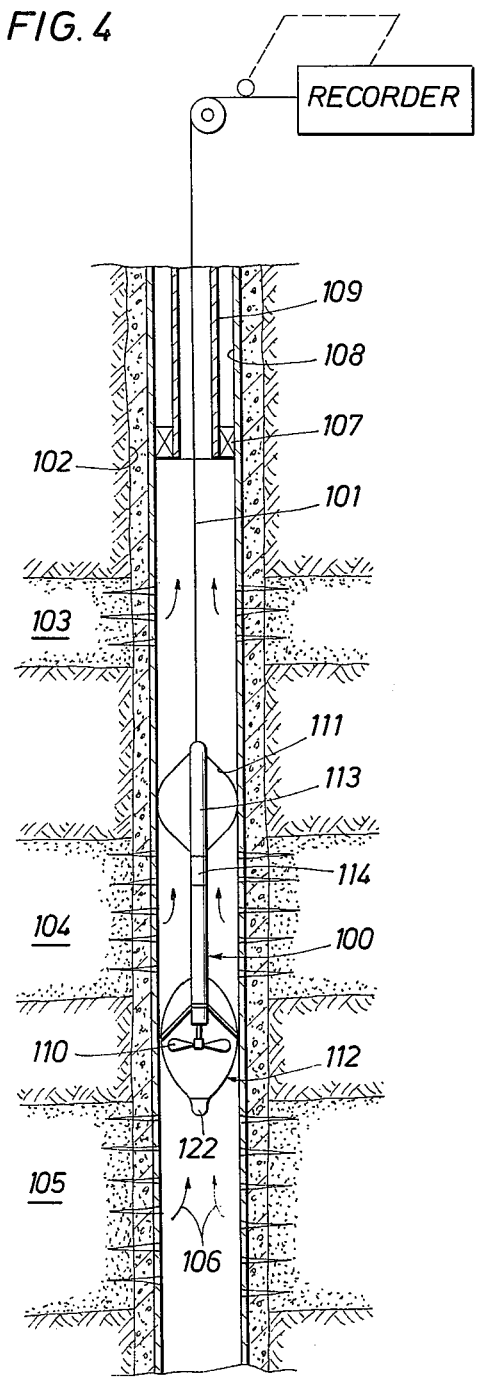

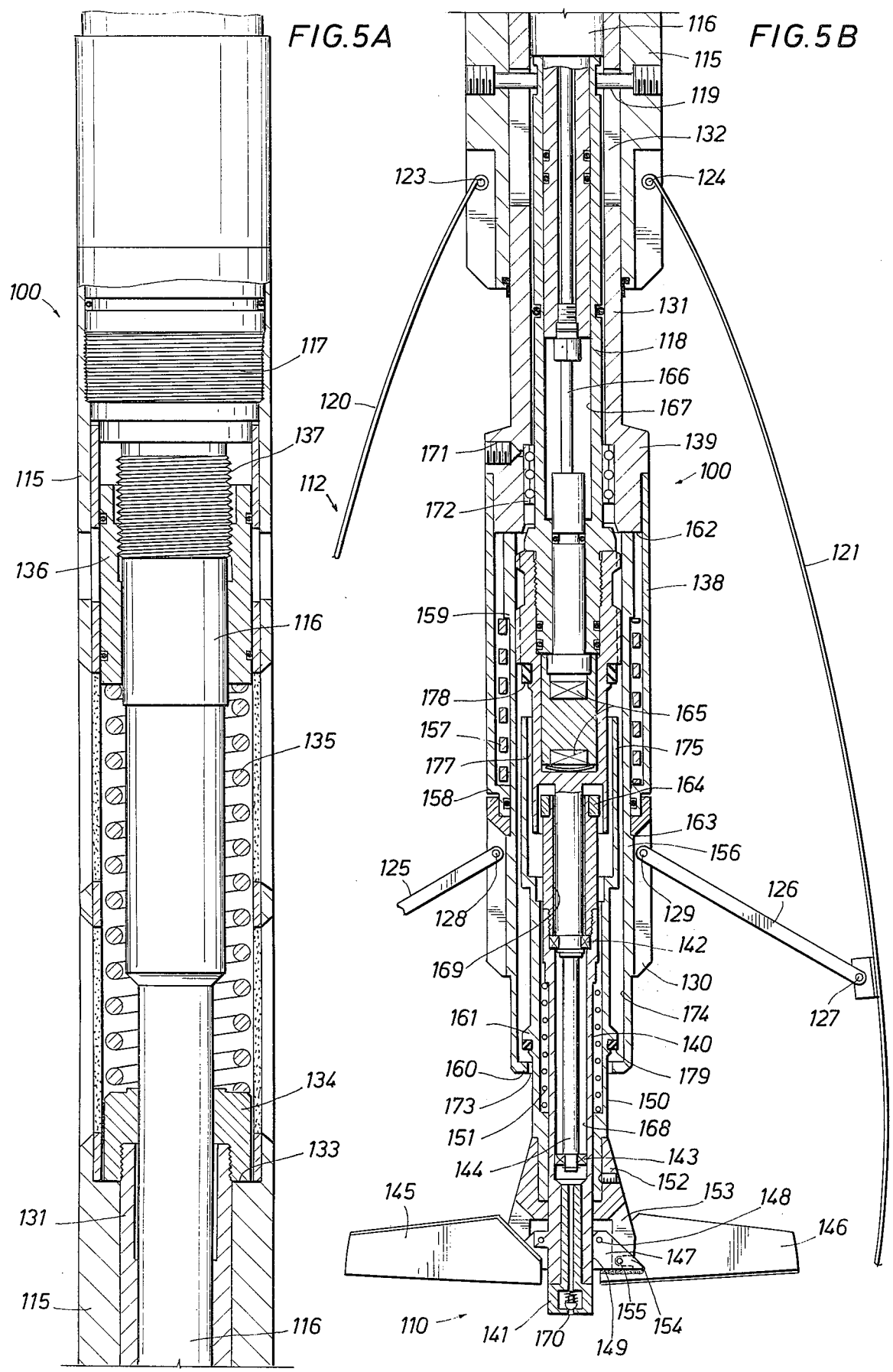

APPARATUS FOR MEASURING THE DIAMETER OF A WELL BORE

This application is a continuation of U.S. application Ser. No. 485,059, filed July 1, 1974 now abandon.

It will, of course be appreciated that so-called "wireline" calipers as well as many other well-completion tools must be maintained in substantial alignment with the central axis of a well bore during their operation. Ordinarily, such centering functions are accomplished by three or more elongated bow springs which are biased outwardly against the well bore wall to center the tool without unduly impeding its travel through the well bore. It is recognized, however, that such minimal centering forces are inadequate for centralizing a well tool of even limited weight in a highly-deviated well bore interval.

Accordingly, as fully described in U.S. Pat. No. 3,555,689, one highly-successful well bore caliper which has been employed heretofore in deviated or non-vertical well bores includes circumferentially-spaced pairs of pivotally-interconnected longitudinally-disposed arms which are arranged along the tool body to respectively position their interconnected ends against the middle of each of the several bow springs. Spaced collars carrying the bow springs and the pivotally-interconnected positioning arms are slidably mounted on the tool body for limited movement as an assembly between longitudinally-spaced stops. In this manner, regardless of which direction the tool is moving, the centralizing assembly will shift accordingly along the tool body; and, upon encountering a well bore restriction, the collar which is then trailing will be capable of shifting along the tool body as required for retracting the bow springs.

Since centralizing assemblies such as these must float or shift in a limited span along the tool body, various problems are, of course, presented when the centralizing assembly is coupled to a measurement transducer or some mechanical control device. For example, as shown in the aforementioned patent, the lateral motion of the bow springs is readily translated into electrical signals representative of the well bore diameter by means of an electrical transducer such as a potentiometer such as depicted in FIGS. 3A and 3B of that patent. However, since such a potentiometer must also move back and forth with the sliding collars, it is particularly difficult to reliably isolate the potentiometer from the well bore fluids. Those skilled in the art can, of course, envision other difficulties which could be readily solved if a centralizing assembly which is used in a control or measuring function could be retained in a selected longitudinal position on the tool body.

Accordingly, it is an object of the present invention to provide new and improved well tools which are particularly adapted for operation in non-vertical well bores and specifically arranged for selectively operating various mechanical control devices or diameter-measurement transducers on the tools in response to diametrical variations in a well bore.

These and other objects of the present invention are attained by providing new and improved tool-centralizing means including a plurality of enlongated outwardly-extendible bow springs which are distributed longitudially about the body of a well tool with each spring having one end pivotally secured to the body and its other end longitudinally movable in relation to the tool body. A longitudinally-slidable member is arranged on the tool body and cooperatively biased away from the pivoted ends of the centralizing springs toward a selected location on the body between the midportions of the bow springs and their respective pivoted ends. A corresponding number of rigid arms are respectively pivotally intercoupled between about the mid-portion of each bow spring and the sliding member so that its movement toward its selected location will respectively pivot the arms from a steeply-inclined or generally-longitudinal position toward a generally-lateral position for extending the mid-portions of the bow springs. Diameter-measurement transducer means are operatively coupled as required for providing measurements respectively of the well bore diameter in response to lateral movement of the mid-portions of the springs.

The novel features of the present invention are set forth with particularity in the appended claims. The invention, together with further objects and advantages thereof, may be best understooood by way of the following description of exemplary embodiments of apparatus employing the principles of the invention as illustrated in the accompanying drawings, in which:

FIG. 3 is a schematic diagram illustrating certain design principles of the present invention;

FIG. 4 shows a preferred embodiment of a spinner-type flowmeter also employing a new and improved bow spring centralizing assembly incorporating the principles of the present invention as it will typically appear while operating in a multi-zoned production well; and FIGS. 5A and 5B are successive enlarged cross-sectional views depicting the lower portion of the unique flowmeter shown in FIG. 4 while it is being moved through a large-diameter well bore casing.

Figure 1:
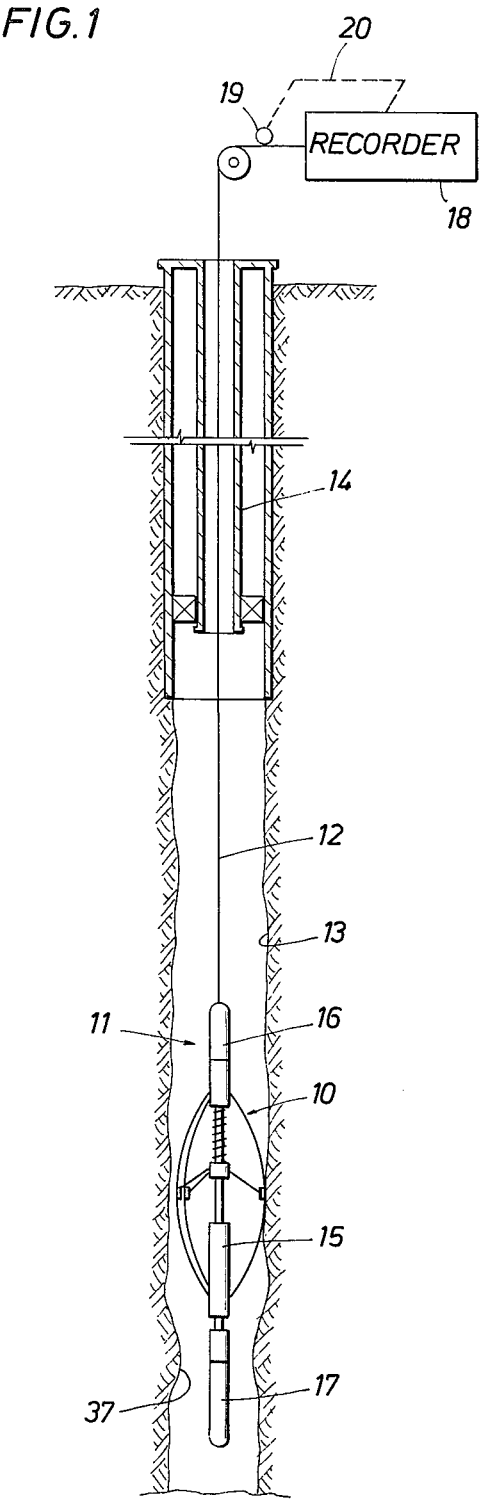
FIG. 1 depicts a preferred embodiment of a new and improved well-calipering tool incorporating the principles of the present invention as the tool is being operated in an uncased well bore interval.

Turning now to FIG. 1, a bow spring centralizing assembly 10 is schematically shown as it may be arranged for providing a new and improved well-calipering tool 11 employing the principles of the present invention. As illustrated, the calipering tool 11 is depicted suspended from an electrical logging cable 12 which is spooled in the usual fashion on a winch (not shown) at the surface and arranged to move the tool through a well bore interval 13 below a typical production string 14 for obtaining a diameter survey of this uncased interval.

In its preferred arrangement, the new and improved calipering tool 11 includes an elongated body 15 carrying the bow spring centralizing assembly 10 that is coupled between an upper body 16 and a lower depending body 17 which are cooperatively arranged for enclosing typical circuitry as required for providing electrical signals representative of the diameter of the well bore interval 13 as well as of any other downhole measurements which the tool may also be equipped to obtain. To record the various output signals of the well tool 11 obtained at the successive depth positions of the tool in the well bore 13, typical surface indicating-and-recording apparatus, such as a CRT or galvanometer recorder 18, is electrically connected to the cable 12 and adapted to be proportionally driven in response to its upward and downward movements by means such as a calibrated cable-engaging measuring wheel 19 that is operatively coupled to the recorder as by a pulse generator or a suitable mechanical linkage 20.

Figure 2:
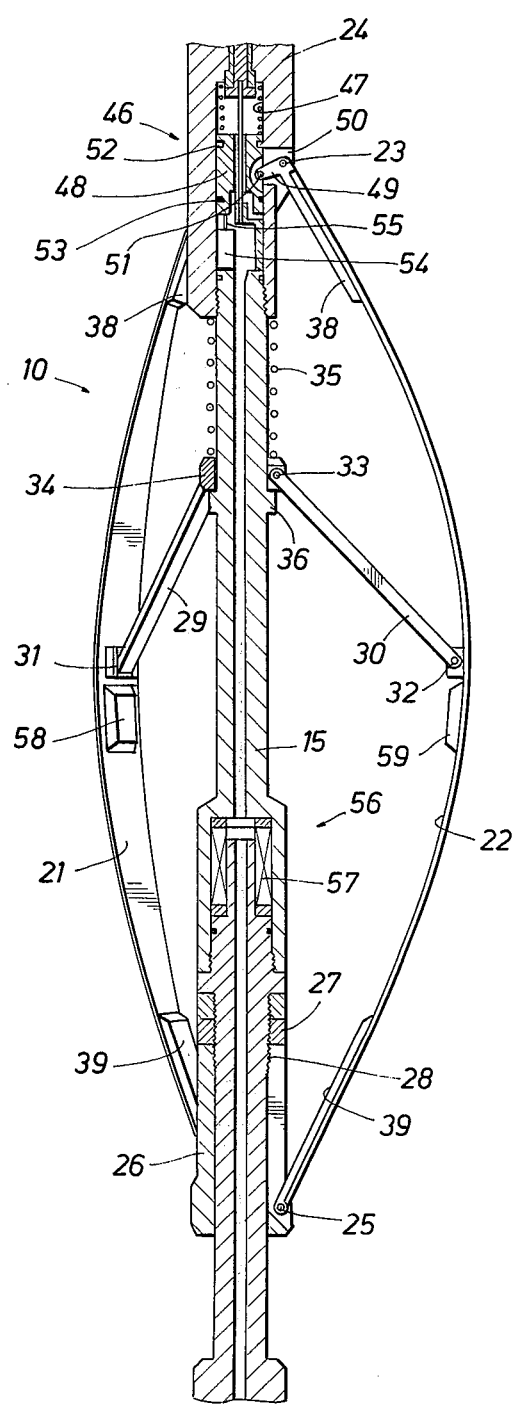
FIG. 2 is an enlarged cross-sectional view of the intermediate portion of the new and improved tool shown in FIG. 1.

Turning now to FIG. 2, an enlarged cross-sectional view is shown of a preferred embodiment of the new and improved well-calipering tool 11 as it will appear when the bow spring assembly 10 is in its fully-extended position. As illustrated, the bow spring centralizing assembly 10 includes at least three elongated and somewhat-arcuate or outwardly-bowed leaf springs, as at 21 and 22, which are distributed uniformly in upright positions around the body 15. As will be understood from the drawings, one set of the upper and lower ends of the three bow springs, as at 21 and 22 are cooperatively coupled (as by first coupling means) to a first portion of the body 15 for only pivotal movement in relation thereto as the bow springs respectively pivot together in relation to the body between outwardly-extended positions and inwardly-retracted positions adjacent to a second portion of the body; and the other set of the upper and lower ends of the three bow springs are cooperatively coupled (as by second coupling means) to each other for longitudinal movement together in relation to the body. In the preferred embodiment of the invention shown in the drawings, the one set of spring ends is the upper ends of the three bow springs, as at 21 and 22; and the aforementioned first coupling means include transversely-oriented pivots, as at 23, respectively fixing the upper ends of the springs to an enlarged upper portion 24 of the body 15 (which upper portion represents the aforementioned first body portion). Thus, in the illustrated preferred embodiment, the aforementioned other set of spring ends is the lower ends of the bow springs, as at 21 and 22; and the aforementioned second coupling means iclude transversely-oriented lower pivots, as at 25, which respectively secure the lower ends of the springs to a collar 26 that is itself slidably disposed for longitudinal movement on the lower portion of the body 15 below the aforementioned second body portion. Since it may be desirable to adjust the extended positions of the bow springs, as at 21 and 22, one or more movable abutments or stops 27 are preferably coupled to the body as by threads 28 of a sufficient length to allow the upper travel limit of the slidable collar 26 to be established as required.

To coordinate the lateral movements of the bow springs as at 21 and 22, the lower or outer ends of a corresponding number of rigid links or arms, as at 29 and 30, are each movably coupled to the intermediate portions of the spring members as by first interconnecting means including transversely-oriented first pivots 31 and 32 which are located on intermediate portions of the springs such as slightly above the mid-points of each of the bow springs; and the arms are respectively extended upwardly and their upper and inner ends movably coupled, as by second interconnecting individual transversely-oriented second pivots 33, to a slidable coupling member such as a collar 34 which is slidably mounted around the intermediate portion of the body 15 between the aforementioned first and second body portion. In the preferred manner of imposing a downwardly-directed force on the rigid arms as at 29 and 30, biasing means are arranged such as a stout compression spring 35 coaxially mounted around the body 15 between the enlarged upper portion 24 and the collar 34 and cooperatively arranged for normally biasing the collar downwardly from one operating position between the aforementioned first and second body portions and toward a selected other operating position between that one operating position and the second body portion, with this other operating position being as best defined by a stop or shoulder 36 on the intermediate portion of the body. It will, of course, be understood that the shoulder 36 could also be conveniently arranged as a threadedly-coupled abutment on the body 15 which would either supplement or replace the lower abutment 27 as a means for selectively limiting the outward extension of the bow springs as at 21 and 22.

Accordingly, with the new and improved well bore caliper 11 arranged as depicted in FIG. 2, it will be appreciated that as the bow springs, as at 21 and 22, are expanded outwardly for sliding engagement along a wall of a well bore such as the uncased interval 13 (FIG. 1), the collar 34 will be correspondingly moved downwardly toward the abutment or shoulder 36. This movement of the collar 34 will, therefore, swing the arms, as at 29 and 30, to a less-inclined or nearly-lateral position for respectively imposing an outwardly-directed centering force against each of the bow springs, as at 21 and 22, which progressively increases as the rigid arms are swung outwardly by the downward displacement or travel span of the sliding collar. Since the centralizing force provided by each of the bow springs, as at 21 and 22, will propotionally decrease as they expand, it will be recognized that the overall centering force developed by the centralizing assembly 10 will be equal to the summation of the centering forces respectively provided by the individual biasing forces of its several bow springs, as at 21 and 22, as well as the biasing force of the compression spring 35.

Those skilled in the art will recognize, therefore, that by selectively establishing the several relevant design parameters for the bow springs, as at 21 and 22, and the biasing spring 35, the overall centering force of the centralizing assembly 10 can be made sufficiently large to maintain the well-calipering tool 11 closely centered in even highly-deviated wells. Moreover, by using design principles similar or analogous to those described in U.S. Pat. No. 3,097,433, the overall centering force of the centralizing assembly 10 can be established at a selected substantially-constant level within the travel span of the bow springs as at 21 and 22. By designing the centralizing assembly 10 to provide a substantially-constant centering force, movement of the new and improved calipering tool 11 through a well bore will, of course, be facilitated.

Before the measuring functions of the caliper tool 11 are considered, it must be appreciated that, in keeping with the objects of the present invention, the bow springs, as at 21 and 22, should be capable of readily retracting as may be required for the new and improved caliper 11 to pass various well bore obstructions. There is, of course, no particular problem where the caliper tool 11 is moved into a gradual diametrical reduction in a well bore. The most serious cndition is, however, where the centralizing assembly 10 encounters an abrupt reduction in diameter such as a ledge, as at 37 in FIG. 1, when the well calipering tool 11 is being lowered into the uncased interval 13. Similarly, as the new and improved caliper 11 is being raised in the well bore interval 13, the centralizing assembly 10 must also be capable of readily retracting as it enters the lower end of the production string 14 without dangerously increasing the tension in the suspension cable 12.

It will be recognized, therefore, that the centralizing assembly 10 must be capable of retracting without undue resistance whenever one or more of the several bow springs, as at 21 and 22, are subjected to either an upwardly-directed force or a downwardly-directed force. Thus, to examine the effects of such longitudinal forces on the centralizing assembly 10, FIG. 3 is presented to schematically represent the responses of one of the bow springs, as at 22, and its associated rigid arm, as at 30, when the bow spring is subjected to either a downwardly-acting force, $F_1$, or an upwardly-directed force, $F_2$.

Taking the situation first of all where the new and improved well-calipering tool 11 is moved upwardly in the uncased interval 13 and encounters the lower end of the production string 14, it will be appreciated that a downwardly-directed force, as at $F_1$, will be imposed on the upper portion of the bow spring 22 at some point between the pivots 23 and 32. It will be recognized, however, that since the upper end of the bow spring 22 is pivoted, as at 23, to the tool body 15, the upper portion of the bow spring must pivot downwardly and inwardly about this upper pivot. As this occurs, the lower and outer end of the rigid arm 30 will also be swung downwardly and inwardly toward the body 15 along a relatively-flat arc of travel and thereby cause the collar 34 to shift slightly upwardly along the tool body as required to accommodate the changing angular position of the arm.

It will be seen, therefore, that the normal response of the centralizing assembly 10 is to retract readily whenever it encounters a downwardly-acting force as at $F_1$. Ordinarily, the rigidity of the bow springs, as at 22, between the pivots 23 and 32 is sufficient to preclude a downward force, as at $F_1$, from buckling the upper portion of the spring inwardly or downwardly so as to resist any tendency of the outer pivot to move outwardly instead of inwardly. Should it be found, however, that such buckling may occur, the upper portions of the bow springs, as at 21 and 22, could be further stiffened by respectively securing a reinforcing member, as at 38 in FIG. 2, on the upper end of each bow spring. As shown there, this may be done most conveniently by arranging these reinforcing members, as at 38, to serve as the upper end connections for the bow springs, as at 21 and 22, for cooperation with the upper pivots as at 23. Similarly, it is also preferred to provide indentical or comparable end connections, as at 39, for the lower ends of the bow springs as at 21 and 22.

As previously noted, the most-severe operating condition will be when the well-calipering tool 11 is moving downwardly and the centralizing assembly 10 encounters a landing nipple or some similarly abrupt reduction in diameter in a well bore. Thus, as schematically illustrated in FIG. 3, the lower portions of the bow springs will be subjected to an upwardly-directed force, as at $F_2$, which would, at first blush, appear to induce spreading or expansion of the springs as at 21 and 22 and shift the lower collar 26 upwardly along the tool body 15. As diagrammatically illustrated in FIG. 3, however, it can be shown that by virtue of the unique arrangement of the centralizing assembly 10, it will be retracted so long as the force $F_2$ is acting above the instantaneous or momentary center of rotation, as at 40, of the lower portion of the bow spring 22 (i.e., that portion thereof which lies between the pivots 25 and 32).

To understand this conclusion, it should first of all be recognized that when the force $F_2$ is initially imposed on the lower portion of the bow spring 22, its upper end (i.e., at the intermediate pivot 32) can move only inwardly or outwardly along an arc 41 whose center is the upper pivot 23. Secondly, at the same time, the lower end of the lower portion of the bow spring 22 (i.e., at the lower pivot 25) can move only upwardly or downwardly along the tool body 15. The initial infinitesimal increment of the longitudinal travel of the lower pivot 25 can, however, be considered as being along an arc, as at 42, whose center, as at 43, lies along a normal or radius 44 perpendicular to the axis of the tool body 15 and passes through the lower pivot.

Accordingly, whenever an upwardly-directed force, as at $F_2$, is imposed on some part of the lower portion of the bow spring 22 lying between the pivots 25 and 32, there will be an initial tendency for this lower portion to rotate infinitesimally about a momentary center of rotation, as at 40, which is geometrically defined by a line 45 that intersects the normal line 44 and perpendicularly intersects the lower portion of the bow spring. Thus, a rudimentary statics analysis will demonstrate that if the force, $F_2$, is acting on the lower portion of the bow spring 22 at some point below this momentary center of rotation 40, the lower pivot 25 must move upwardly along the arc 42 while the intermediate pivot 32 swings outwardly along the arc 41 as the lower portion of the bow spring momentarily turns about this center of rotation. Conversely, as illustrated in FIG. 3, if the force $F_2$ is applied above this momentary center of rotation 40, the lower pivot 25 must shift downwardly along the tool body 15 as the intermediate pivot 32 swings inwardly along its arc of travel 41.

It will be realized, therefore, that for a given well bore diameter, this momentary center of rotation, as at 40, for the lower portion of the bow spring 22 will be moved closer to the tool body 15 as the length of this lower portion of the bow spring is increased. Thus, in the usual situation, it is preferred that the lower portions of the bow springs, as at 21 and 22, be at least somewhat longer than their upper portions so that the lower portions will be steeply inclined in relation to the tool body 15 so as to keep their momentary centers of rotation, as at 40, fairly close to the tool body 15 and the lower pivots, as at 25.

As previously discussed, the centralizing assembly 10 is particularly arranged for operating various diameter-measurement transducers which could not otherwise be conveniently or reliably operated if the centralizing assembly was free to shift longitudinally along the tool body 15 as does the aforementioned Cubberly centralizing assembly. As one example of this significant feature, the diameter-measuring means 46 of the new and improved well-calipering tool 11 are most conveniently located on the uppor portion of the tool body 15. It will, of course, be recognized that since the bow springs, as at 21 and 22, move in unison and that the operating position of any of them is directly proportional to the diameter of the well bore in which the centralizing assembly 10 is then situated, the diameter-measuring means 46 can be readily operated by sensing the position of any movable part of one of the springs.

Accordingly, in a preferred manner of arranging actuating means for the the diameter-measuring means 46 on the new and improved caliper 11, the tool body 15 includes an enlarged axial chamber 47 in which a longtiudinally-movable tubular member 48 serving as a first actuating member is slidably mounted and operatively coupled to the bow spring 22 by means such as an extension or crank arm 49 serving as a second actuating member on the movable end fitting 38 which is projected through an opening 50 in the body and pivotally coupled, as at 51, to the slidable member. To prevent well bore fluids from entering the chamber 47, sealing members, as at 52 and 53, are cooperatively arranged around the opposite ends of the slidable actuating member 48 and engaged with the walls of the chamber above and below the body opening 50. A position-sensing electrical transducer, such as a potentiometer 54, is mounted within the chamber 47 and cooperatively coupled, by means as at 55, to the slidable actuating member 48 for providing a varying electrical characteristic which is indicative of the longitudinal position of the slidable member. It will, therefore, be recognized that the transducer 54 can be readily calibrated to provide accurate measurements which are representative of the lateral positions of the bow springs, as at 21 and 22, which are, in turn, directly related to the diameter of the well bore interval which the centralizing assembly 10 is then situtated.

As also shown in FIG. 2, the new and improved well-calipering tool 11 may also include a collar locator 56 such as fully described in U.S. Pat. No. 3,267,365 which is incorporated by reference herein. To accomplish this, at least an intermediate portion of the tool body 15 is made of a non-magnetic material and cooperatively arranged to enclose a sensing coil 57. Magnets, as at 58, and 59, are appropriately located on the rear of the bow springs, as at 21 and 22, for inducing electrical signals in the sensing coil 57 which are indicative of the movement of the tool 11 past magnetic anomalies such as collars in the production string 24. Since U.S. Pat. No. 3,267,365 fully describes the arrangement of such anomaly-responsive devices, it is, of course, unnecessary to describe the further details of the collar locator 56.

It will, of course, be appreciated that the centralizing assembly 10 is also well suited for operating various mechanical devices which might be included on other types of well tools. For example, a spinner-type flowmeter 100 such as that described in a copending United States application by the present inventor (Ser. No. 485,058 filed July 1, 1974) is shown as it will appear while suspended from an electrical logging cable 101 and moving along a typical cased production well 102 that penetrates one or more production formations 103–105 which have been respectively perforated for allowing selected connate fluids such as oil, gas or water contained in each formation to enter the well bore, as at 106, and flow together to the surface for collection. As is customary, a typical production packer 107 is set in the casing 108 above the formations 103–105 and a string of small-diameter production tubing 109 is coupled to the packer for providing communication between the isolated interval of the well bore 102 and the surface.

As will be subsequently described in greater detail, the flowmeter 100 includes a multi-bladed propeller or velocity-responsive spinner 110 which is rotatively coupled to the lower end of the tool. To maintain the flowmeter 100 in a centered position in the casing 108, upper and lower bow-spring centralizing assemblies, as respectively shown generally at 111 and 112, are mounted at spaced intervals on the tool. The lower centralizing assembly 112 is arranged in keeping with the centralizing assembly 10 as discussed above and disposed around the spinner 110 to prevent it from striking the casing 108 even in highly-deviated well bores.

Although other arrangements can, of course, be provided, the body 113 of the flowmeter 100 preferably encloses electronic circuitry (such as that described in U.S. Pat. No. 3,630,078 which is hereby incorporated by reference herein) for providing electrical signals which are functionally representative of the flow rates or velocities of the several well bore fluids as at 106. A collar locator 114 is also preferably included with the tool 100 and is coupled to the cable 101 for providing electrical depth-correlation signals as the flowmeter successively passes the collars in the string of casing 108 in the well bore 102.

Turning now to FIGS. 5A and 5B, successive cross-sectional views are shown of the lower section of the flowmeter 100 below the collar locator 114 as the flowmeter will appear while moving through the casing 108. Inasmuch as the particular arrangement of the flowmeter 100 is fully described in the inventor's aforementioned copending application, it is necessary only to describe those portions of the flowmeter which emphasize the significant and unique aspects of the centralizing assembly 112 when it is employed for selectively positioning the several blades of the spinner 110. Accordingly, as illustrated, the lower body of the flowmeter 100 is formed of an outer tubular member 115 which is coaxially spaced around a smaller enlongated member 116 and secured to an enlarged upper end portion 117 of the inner member. For convenience of assembly, a second inner member 118 is dependently coupled to the lower end of the first inner member 116 by one or more laterally-extending bolts, as at 119, which are projected inwardly from the wall of the outer member 115 and releasably secured to the second inner member.

In keeping with the objects of the present invention, the centralizing assembly 112 includes at least three greatly-elongated and somewhat-arcuate or slightly-biased leaf or bow springs, as at 120 and 121, which are distributed uniformly around the lower portion of the flowmeter 100 and respectively extended upwardly from a central member or common nose piece 122 (FIG. 4) positioned well below the spinner 110 to individual transversely-oriented pivots, as at 123 and 124, located at uniform intervals around the lower portion of the outer body member 115 (FIG. 5B). To selectively urge the bow springs outwardly, the outer ends of a corresponding number of rigid arms, as at 125 and 126, are each coupled to pivots, as at 127, located somewhat above the midpoints of each of the bow springs 120 and 121; and the arms are respectively extended upwardly to suitable pivots, as at 128 and 129, which are symmetrically distributed around an enlarged-diameter collar 130 that is coaxially disposed around the lowermost portion of the lower body member 118.

To impose a downwardly-directed force on the several arms, as at 125 and 126, a downwardly-biased elongated mandrel 131 is coaxially mounted around the inner body members 116 and 118 and adapted for longitudinal movement between an upper position as determined by the engagement of the pins 119 with the bottom edges of a corresponding number of longitudinal slots, as at 132, in the mandrel and a lower position as determined by the upper face 133 of an inward enlargement of the outer body member 115 and the enlarged upper head 134 of the mandrel. In the preferred manner of providing a downwardly-acting biasing force on the mandrel 131, a stout coil spring 135 is coaxially mounted around the inner body member 116 within the outer body member 115 and maintained in compression between the enlarged mandrel head 134 and an adjusting nut 136 which is cooperatively mounted on the inner body member by threads 137 of sufficient length to permit limited adjustments to be made in the position of the nut. As best seen in FIG. 5B, the downwardly-acting biasing force of the spring 135 on the mandrel 131 is preferably transferred to the collar 130 by dependently coupling an elongated tubular member 138 to the enlarged lower end 139 of the mandrel and engaging the lower end of the tubular member with the upper end of the slidable collar.

Before describing how the centralizing assembly 112 is capable of serving as a mechanical actuator to achieve the objects of the present invention, it should be noted that the flowmeter spinner 110 includes an elongated hollow shaft 140 having a closed lower end wall 141 and which is cooperatively jounalled by a pair of longitudinally-spaced ball or roller bearings 142 and 143 on an axial spindle 144 defined by the lower end of the inner body member 118. So that it may be of maximum diameter commensurate with the size of the casing 108, the spinner 110 is provided with two or more elongated blades, as at 145 and 146, which are pivotally mounted at uniform intervals around the lower end of the hollow shaft 140 and cooperatively arranged for selective movement between upwardly-directed retracted or running-in positions and their extended or operating positions as shown in FIG. 5B. The spinner blades 145 and 146 are adapted for movement between these positions by securing the inboard end of each of the blades to the lower edge of a vertically-aligned triangular plate, as at 147, having its upper corner pivotally coupled, as at 148, to the hollow shaft 140. To stabilize the several spinner blades 145 and 146 in their respective unfolded positions, the inwardly-directed base or upright edge, as at 149, of each blade-support link, as at 147, is complementally shaped for abutment against the hollow shaft 140 when the blades are extended to their operating positions depicted in FIG. 5B.

It will, therefore, be recognized that the movements of the spinner blades 145 and 146 between their extended and retracted positions must be coordinated with the extension and retraction of the centralizing assembly 112. To accomplish this, a tubular actuating member 150 is coaxially mounted around the hollow shaft 140 and cooperatively biased downwardly along the shaft by a light spring 151 arranged between opposed shoulders on the two members. The blade-positioning member 150 is provided with an enlarged lower head 152 which is operatively coupled to the spinner blades, as at 145 and 146, by providing a number of longitudinal slots, as at 153, in the head which are respectively arranged to be slidably disposed over the outer portions of the several blade-support links as at 147. An outwardly-opening circumferential groove 154 is formed around the enlarged head 152 and cooperatively arranged for loosely receiving transversely-oriented pivots, as at 155, which are respectively mounted on the outer portion of each blade-support links as at 147.

Accordingly, when the blade-positioning member 150 is moved downwardly by the compression spring 151 against the outer pivots, as at 155, the spinner blades, as at 145 and 146, will be respectively swung downwardly to their extended positions as shown in FIG. 5B. Conversely, it will be recognized that upward movement of the blade-positioning member 150 in relation to the hollow shaft 140 will simultaneously swing the blades 145 and 146 upwardly about their respective pivots as at 148. Thus, to move the blade-positioning member 150 upwardly against the biasing force of the spring 151 as the centralizer 112 is being retracted, an elongated tubular member 156 is coaxially disposed around the blade-positioning member and extended upwardly through the collar 130 and the depending mandrel extension 138 and around the exterior of the inner body member 118. A fairly-stout compression spring 157 is coaxially disposed between opposed shoulders 158 and 159 on the depending tubular member 138 and the elongated tubular member 156, respectively, and operatively arranged for raising the elongated tubular member upwardly whenever the collar 130 is moved upwardly. To shift the blade-positioning member 150 upwardly in relation to the shaft 140 as the centralizing assembly 112 is being retracted, the inwardly-enlarged lower end 160 of the elongated tubular member 156 is cooperatively located in relation to an outwardly-enlarged shoulder 161 on the blade-positioning member for raising it a sufficient distance to fully retract the spinner blades, as at 145 and 146, before the centralizer springs 120 and 121 are fully collapsed against the flowmeter 100.

Accordingly, it will be appreciated that when the centralizer springs 120 and 121 are fully retracted against the flowmeter 100, the rigid arms 125 and 126 will be in a nearly-erect 42 position for supporting the collar 130 against the downwardly-directed biasing force which is imposed thereon by the spring 135 acting through the mandrel 131 and its depending extension sleeve 138. Moreover, in this fully-retracted position of the flowmeter 100, the fairly-stout compression spring 157 will be effective for urging the elongated tubular member 156 upwardly with sufficient force against the shoulder 161 to support the blade-positioning member 150 in an elevated position for retaining the spinner blades 145 and 146 in their respective folded or retracted positions.

It will be recognized, therefore, that as the flowmeter 100 emerges from the lower end of the production tubing 109 into the cased well bore interval 108 below the packer 107, the spring 135 will urge the collar 130 downwardly as the lower ends of the rigid arms, as at 125 and 126, are being moved outwardly to expand the centralizing assembly 112. Of particular interest, it will be noted that as the mandrel 131 is urged downwardly by the stout spring 135, the fairly-stout spring 157 will be slightly compressed until a downwardly-facing shoulder 162 defined by the lower end of the mandrel contacts the upper end of the elongated tubular member 156 as an abutment on the collar 130 also contacts an upwardly-facing exterior shoulder 163 on the tubular member. Once this occurs, the fairly-stout spring 157 will be effectively immobilized or deactivated so that further downward travel of the mandrel 131 in response to the force of the stout spring 135 will now simultaneously shift the collar 130 and the elongated member 156 downwardly in relation to the body member 118. It will, of course, be recognized that as the collar 130 is moved further downwardly, the lower ends of the rigid arms, as at 125 and 126, will be swung upwardly and outwardly about their respective pivots 128 and 129 by the accompanying expansion of the centralizer springs, as at 120 and 121.

Accordingly, by the time that the centralizing assembly 112 is fully expanded, the elongated member 156 will have been moved downwardly a sufficient distance to disengage the shoulder 160 on its lower end from the external shoulder 161 around the blade-positioning member 150. Thus, as shown in FIG. 5B, the downward movement of the elongated actuating member 156 will be more than adequate for enabling the spring 151 to then shift the blade-positioning member 150 downwardly in relation to the hollow shaft 140 for simultaneously swinging the spinner blades, as at 145 and 146, downwardly and outwardly about their pivots, as at 148, to their respective extended or operating positions.

It will, of course, be appreciated that once the spinner blades, as at 145 and 146, are extended, relative movement of well bore fluids past the blades will be effective for rotating the hollow shaft 140 about the bearings 142 and 143 on the spindle 144. Thus, in keeping with the aforementioned Bonnet patent, one or more magnets, as at 164, are cooperatively arranged on the upper end of the rotatable shaft for inducing proportional electrical signals in a sensing coil 165, which is cooperatively connected to electrical conductors 166, extended upwardly through suitable seals in a passage 167 in the inner body members 116 and 118 for connection to the circuitry 113 (FIG. 4).

It should be particularly noted in FIG. 5B that the upper and lower shaft bearings 142 and 143 are fully enclosed within the hollow shaft 140 and that the only communication with the enlarged annular space or chamber 168 surrounding the bearings is by way of the relatively-narrow annular clearance gap 169 defined between the shaft and the spindle 144. Thus, the bearing chamber 168 can be readily filled (by way of a suitable fitting 170 in the end wall 141 of the shaft 140) with a suitable lubricant (not shown) to protect the bearings 142 and 143 during the operation of the flowmeter 100. By arranging a normally-closed port 171 in the lower portion of the mandrel 131, it can be assured that a lubricant introduced by way of the normally-closed fitting 170 will in time be exhausted from the port while it is opened and thereby lubricate a so-called "linear bearing" 172 located on the mandrel next to the port to facilitate the longitudinal travel of the mandrel in relation to the inner body member 118.

It will, of course, be appreciated from FIG. 5B that as the flowmeter 100 is being operated in a well bore, as at 108, fluid-borne debris particles such as sand and the like can readily pass through the annular gap 173 between the end 160 of the actuating member 156 and the exterior of the blade-positioning member 150. Thus, although the annular chamber 174 defined between the blade-positioning member 150 and the elongaged tubular member 156 will be well filled with the excess lubricant from the bearing chamber 168, it is quite possible for fluid-borne debris to ultimately be driven into the bearing chamber and in time damage the bearings 142 and 143.

Accordingly, to be further assured that the bearing chamber 168 is well isolated from the outer chamber 174, the upper end of the tubular blade-positioning member 150 is extended, as at 175, a substantial distance above the upper end of the shaft 140 and a tubular skirt 176 depending from the inner body member 118 is coaxially disposed within the tubular extension and extended downwardly around the upper end of the hollow shaft. In this manner, the upwardly-directed extension 175 and the downwardly-directed skirt 176 together with the narrow shaft clearance space 169 define a multi-directional or tortuous communication passage, as at 177 generally, between the inner and outer lubricant chambers 168 and 174 for effectively preventing the unwanted entry of foreign matter in the well bore fluids into the bearing chamber.

Those skilled in the art will, of course, appreciate that as the flowmeter 100 is being moved through the small-diameter production string 25 (FIG. 4), there will be a substantial increase in the velocity of the well bore fluids passing the flowmeter. Thus, any fluid-borne debris will be driven against the lower end of the flowmeter 100 with considerable velocity. Accordingly, as another example of how the centralizing assembly 112 can be used to control various mechanical elements, valve means are provided for closing off at least the bearing chamber 168 so long as the flowmeter 100 is not being operated. In the preferred manner of arranging such valve means, sealing means are provided such as a typical seal ring 178 which is mounted on the inner body member 118 and cooperatively arranged to be sealingly engaged with the upper end of the tubular extension 175 when the blade-positioning member 150 is moved to its elevated position for sealing the outer end of the tortuous passage 177. Similarly, it is also preferred to include additional valving means including a typical seal ring 179 that is cooperatively mounted on the shoulder 161 and arranged for engagement by the shoulder 160 as the elongated tubular member 156 is shifted to its elevated position. It will be appreciated, therefore, that when the centralizing assembly 112 is fully retracted, the seals 178 and 179 will respectively cooperate for blocking entrance of fluid-borne debris into the inner and outer lubricant chambers 168 and 174 and the passage 177. Undue loss of the lubricant in the outer chamber 174 will also be at least minimized by virtue of the seal 179.

Accordingly, it will be recognized that the centralizing assemblies as at 10 and 112 are particularly suited for efficient operation even in highly-deviated well bores. By virtue of the outwardly-biased pivoted arms which are coupled to the rear of the centralizing springs, these members will always be positioned at a uniform lateral spacing away from the tool body so as to maintain the tool closely centered in the well bore. Moreover, since the new and improved centralizing assemblies are cooperatively arranged so that the theoretical or momentary centers of rotation of the lower portions of the several bow springs are always close to the tool body and near the lower ends of the springs, an upwardly-directed impact on the springs will cause the springs to retract in all but very unusual situations. Similarly, the upward inclination of these positioning arms serves to effect retraction of the centralizer springs in response to downwardly-directed impacts. Accordingly, the unique arrangement of the centralizing assemblies cooperatively allows the movements of the bow springs to be utilized for operating either various mechanical control devices or suitable diameter-measuring transducers.

While only particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A well-calipering tool adapted for movement through a well bore and comprising:

a body having longitudinally-spaced upper and lower portions and adapted for suspension in a well bore;

at least three elongated bow springs circumferentially spaced in upright positions around said body with the mid-point of each of said bow springs being laterally disposed from an intermediate portion of said body situated between said upper and lower body portions;

first coupling means pivotally securing a first end of each of said bow springs to a first one of said upper and lower body portions for limiting said first spring ends to only pivotal movement in relation to said one body portion as said spring mid-points respectively move between a laterally-extended position and a retracted position adjacent to said intermediate body portion;

second coupling means cooperatively intercoupling the second end of each of said bow springs to each other for longitudinal movement together in relation to a second one of said upper and lower body portions and including a collar slidably mounted for longitudinal travel on said second body portion, means pivotally coupling said second spring ends to said collar, and stop means cooperatively arranged on said second body portion for limiting at least the longitudinal travel of said collar toward said intermediate body portion to establish said extended positions of said bow springs;

means cooperatively arranged for maintaining said spring mid-points equidistant from said intermediate body portion and including a coupling member slidably disposed on said body for longitudinal movement thereon between said first spring ends and said intermediate body portion, a corresponding number of rigid links arranged between said coupling member and about the mid-point of each of said bow springs, first pivot means pivotally intercoupling one end of each of said rigid links to about said mid-points of each of said bow springs, second pivot means pivotally interconnecting said coupling member to the other end of each of said rigid links, and biasing means normally urging said coupling member toward said intermediate body portion for coordinating the lateral movements of said bow springs and for imposing a progressively-increasing lateral force thereon as said bow springs move toward their respective extended positions;

electrical transducer means secured to said body and having a selectively-variable electrical characteristic; and transducer-actuating means coupled to at least one of said bow spring operable upon lateral movement of said spring mid-points for proportionally varying said electrical characteristic as a function of well bore diameter.

2. The well tool of claim 1 wherein said transducer-actuating means include a first actuator member cooperatively arranged or mounted on said body between said electrical transducer means and said first end of one of said bow springs for longitudinal movement relative to said body; and a second actuator member mounted on said first end of said one of said bow springs, pivot means intercoupling said first and second actuator members, and means cooperatively coupling said first actuator member and said electrical transducer means and responsive to the pivotal movement of said first end of said one of said bow springs for operating said electrical transducer means to selectively vary said electrical characteristics.

* * * * *